United States Patent [19]
Blakley

[11] Patent Number: 5,880,894
[45] Date of Patent: Mar. 9, 1999

[54] METHOD AND SYSTEM FOR MOUNTING OPTICAL ELEMENTS

[76] Inventor: Rick D. Blakley, 405 N. Granada Ave., No. 7, Tucson, Ariz. 85701

[21] Appl. No.: 899,709

[22] Filed: Jul. 23, 1997

[51] Int. Cl.⁶ .................................................. G02B 07/02
[52] U.S. Cl. ................................................................ 359/819
[58] Field of Search ................................... 359/811, 819, 359/821, 822

[56] References Cited

U.S. PATENT DOCUMENTS

| | | | |
|---|---|---|---|
| 2,137,286 | 11/1938 | Herbig | 359/466 |
| 2,767,612 | 9/1956 | Hoffer | 359/819 |
| 3,751,139 | 8/1973 | Malherbe | 359/822 |
| 4,037,942 | 7/1977 | Guyer | 359/226 |
| 4,978,200 | 12/1990 | Dean | 359/557 |
| 5,058,993 | 10/1991 | Wakugawa | 359/896 |
| 5,071,254 | 12/1991 | Vezain | 359/819 |
| 5,105,312 | 4/1992 | Tiffen et al. | 359/892 |
| 5,245,478 | 9/1993 | Luecke | 359/822 |
| 5,298,096 | 3/1994 | Yoshino et al. | 156/64 |
| 5,353,166 | 10/1994 | Hanford et al. | 359/819 |

Primary Examiner—Georgia Epps
Assistant Examiner—Ricky Mack
Attorney, Agent, or Firm—Burns, Doane, Swecker & Mathis, L.L.P.

[57] ABSTRACT

A support provides a relatively stable support surface for a first disk having an angled surface and a center hole. A second disk having an angled surface and a center portion is inserted into the center hole of the first disk, and a tensioning band encircles a portion of the first disk and the second disk to fix their relative position to one another by friction between the disks. An optical element such as a mirror or lens is mounted to the second disk. By angularly rotating the first and second disks relative to one another, the relative angular alignment of the optical element can be adjusted and fixed by use of the tensioning band.

35 Claims, 10 Drawing Sheets

METHOD AND SYSTEM FOR MOUNTING OPTICAL ELEMENTS

The present invention relates generally to optical mounting mechanisms and more particularly to an improved mounting arrangement for optical elements.

BACKGROUND OF THE INVENTION

Generally, as illustrated in FIGS. 7A and 7B, cells 735 such as mirrors 712 mounted in a dish or on a plate with clips 730, are supported on a structural support 731 with a set of spaced, opposing screws 732 located on concentric rings 733, 734 on the base of the cell. When adjusted, some of the screws push the cell from the structural support and the other screws pull the cell to the structural support thereby changing the angle of the cell relative to the support. Adjustments in the mirror's angle relative to the structural support are achieved by balancing the extensions of the opposing screws. Sometimes, as illustrated in FIGS. 8A and 8B, a spike or ball 836 is surrounded with a single ring 833 of screws 832 extending through the structural support 831 and cell 835. Adjustments are made by balancing the tensions of these screws 832 against the compression of the spike or ball 836. Other times, as illustrated in FIGS. 9A and 9B, a single ring 933 of screws 932 which extend through springs 937 between the cell 935 and the structural support 931 will provide the adjustment since the tensions on the screws 932 will balance the compressions on the springs 937.

All of the above techniques possess the same disadvantages. By using screws and elastic elements such as springs to provide the necessary adjustments, the above designs can release their adjustments over time as a result of the affects of temperature variation and vibration.

SUMMARY OF THE INVENTION

It is an object of the present invention to provide an optical mounting method and system which will maintain its adjustments over time in part by avoiding the use of opposing forces to make the adjustment balance.

It is further object of this invention to provide an optical mounting system and method which will allow the removal and return of an optical element from its support without the loss of collimation or alignment.

The above objects are achieved by an optical mounting system including: a support structure for providing a relatively stable support surface; a first disk connected to the support structure, wherein the first disk has a center hole and an angled surface; a second disk, wherein the second disk has a center portion which inserts into the center hole of the first disk and wherein the second disk also comprises an angled surface; a tensioning band, wherein the tensioning band encircles a portion of the first disk and the second disk; and mounting elements, wherein an optical element is mounted to the second disk.

BRIEF DESCRIPTION OF THE DRAWINGS

The invention will now be described by way of example with reference to the accompanying drawings, in which like components share the same last two digits of their reference numerals, in which.

DETAILED DESCRIPTION OF THE INVENTION

Figure 1:
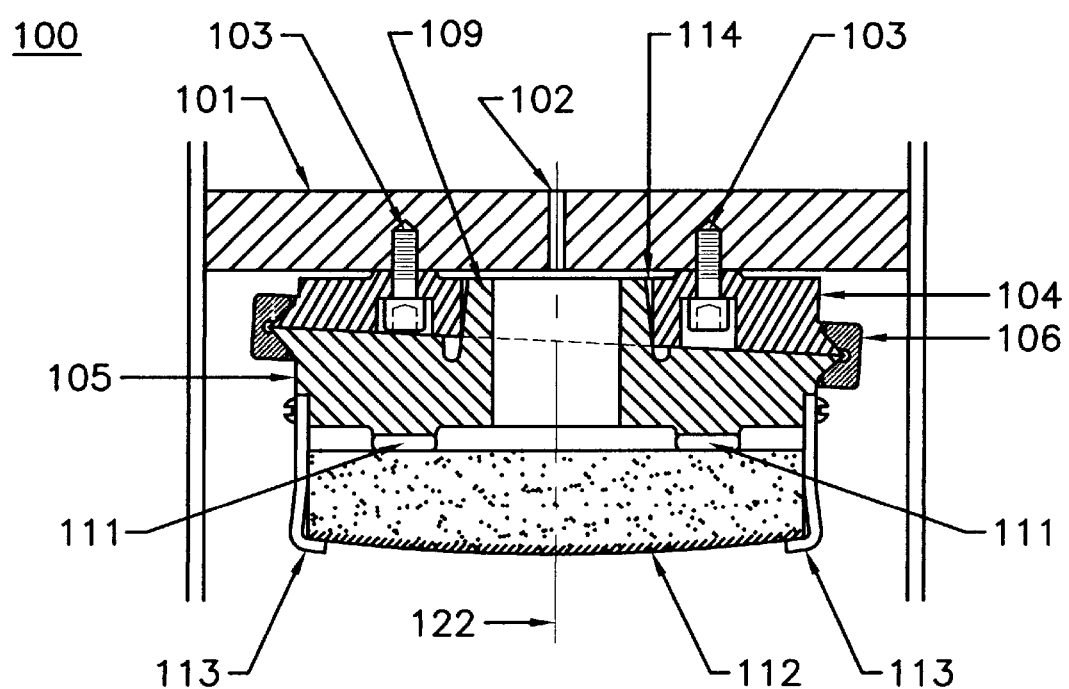
FIG. 1 is a cross-sectional view of one embodiment of the present invention.

Referring to FIG. 1, an optical mounting system 100 is illustrated which includes a structural support 101 connected to a first disk 104. The structural support 101 may be a wall of an optical system, a mount on an air bearing optical table, or any other known structural support for use in optical systems. The first disk 104 includes an angled surface with respect to the mechanical and optical axes 122. The first disk 104 further includes a center hole 114. In addition, the optical mounting system 100 also includes a second disk 105 having an angled surface with respect to the mechanical and optical axes 122. The second disk 105 further includes a center conical portion 109 which inserts into the center hole 114 of the first disk 104. The angled surfaces of both the first disk 104 and the second disk 105 can be described as the intersection of a cylindrical object and a planer surface, wherein the planer surface is at an angle with respect to the longitudinal axis of the cylinder.

A tensioning band 106 surrounds a portion of the first disk 104 and a portion of the second disk 105, and enough tightening is applied to the tensioning band 106 in order to provide friction between the first disk 104 and the second disk 105. An optical element 112, a mirror as shown in FIG. 1, can then be mounted to the second disk 105 by the use of any commonly known mounting elements, e.g., clips 113 and pads 111.

The structural support 101 includes a centering hole 102. Screws 103, or other known fasteners, are used to center and attach the first disk 104 to the structural support 101. The center hole 114 and the center conical portion 109 in the first disk 104 and the second disk 105, respectively, allow for the accurate alignment of the first disk 104 and the second disk 105 on the mechanical and optical axes 122 of the optical mounting system 100 with reference to the centering hole 102 located in the structural support 101. In this embodiment, the longitudinal axis of the center conical portion 109 is centered along the mechanical and optical axes 122. In an alternate embodiment, the center conical portion 109 and the center hole 114 are centered on an axis which is perpendicular to the tilt axis of the first and second disks 104 and 105. In the above alternate embodiment, the center conical portion can be substituted with a center cylindrical portion or any other shaped portion containing a circular base such that contact is made at all times with the base of the center hole 114.

In a preferred embodiment, the first disk 104 is fastened to the structural support 101 with mounting screws 103 which provide for an accurate alignment. The optical element 112 is attached to the second disk 105 with clips 113 or the like. In this embodiment, the second disk 105 serves as the cell for the optical element 112.

The second disk 105 is attached to the first disk 104 by use of the tensioning band 106 in order to increase static friction between the first disk 104 and the second disk 105. The first disk 104 and the second disk 105 are aligned by mating the center conical portion 109 with the center hole 114. In order to insure a tight tolerance between the first disk 104 and the second disk 105, a trench surrounding center conical portion 109 is provided.

Angular alignment of the optical element 112 is achieved by rotating the second disk 105 with respect to the first disk 104 until the optical element 112 is adjusted to the proper angle required for alignment. The range of alignment will be bounded by the difference of the angles of the surfaces of the first disk 104 and the second disk 105 relative to the mechanical and optical axis 122, up to the sum of the angles of the first disk 104 and the second disk 105. When both the first disk 104 and the second disk 105 have equivalent angled surfaces, as is shown in FIG. 1, the range of alignment will be zero to twice the angle of one disk.

Once the proper angle is set for the optical element 112, the structural support 101 can be rotated in order to compensate for the orientation of the optical element 112.

Figure 2:
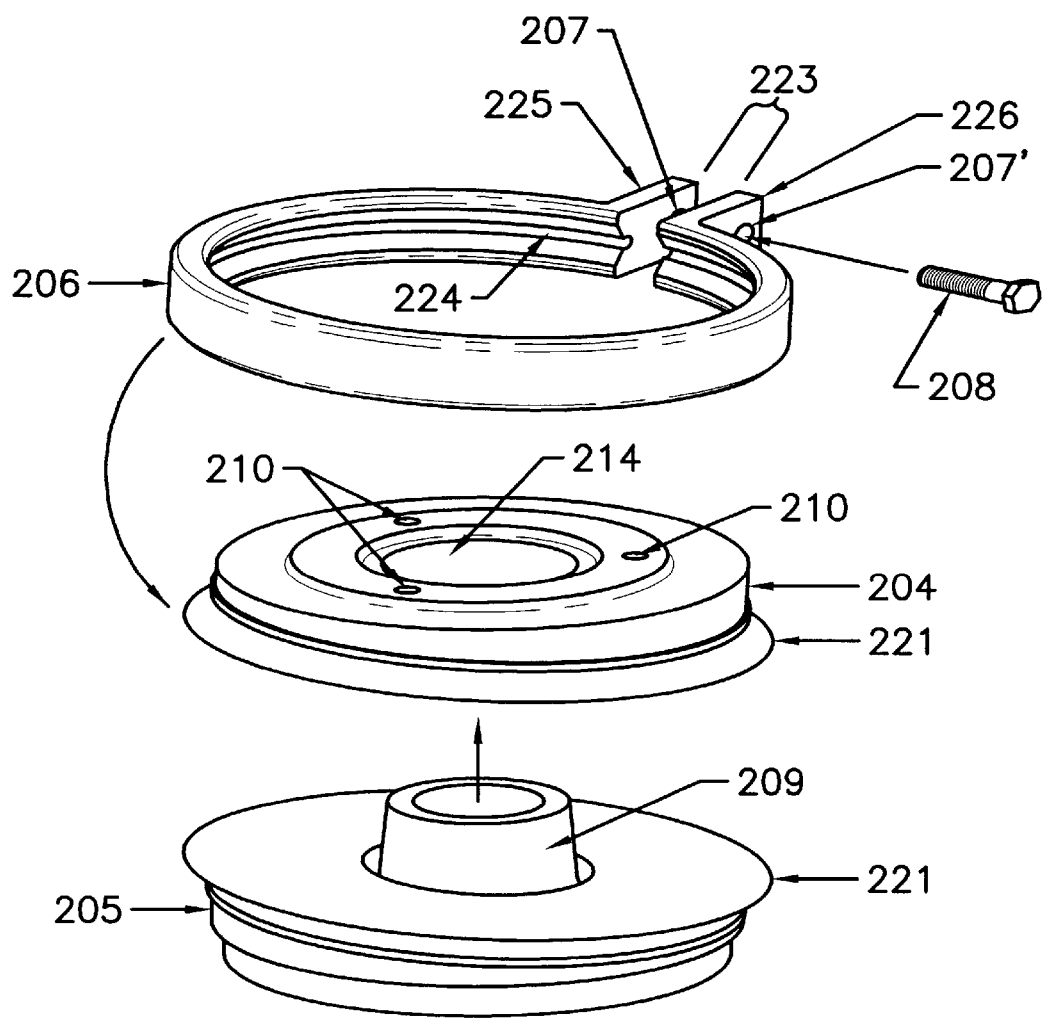
FIG. 2 is an exploded diagram showing component parts of FIG. 1.

Referring to FIG. 2, the tensioning band 206 is circular in shape having a gap 223 between ends thereof, and having flanges 225, 226 on each side of the gap 223. The flange 225 on one side of the gap 223 has a threaded hole 207 and the other flange 226 on the other side of the gap 223 has a non-threaded hole 207' which receives a tensioning screw 208 for selectively tightening of the band 206.

The first disk 204 and the second disk 205 both include lip portions 221 protruding from the peripheral edges of the contacting surfaces of the first and second disks 204, 205. Lip portions 221 insert into a groove 224 located in the inside of the tensioning band 206. The groove 224 consists of two angled sides which meet within the tensioning band 206 such that a cross-section of the groove 224 is triangular in shape. Alternatively, the groove 224 can be semi-circular or any other shape such that circumferential displacement will be converted into an axial compression between the connected disks, thereby increasing the static friction between the first and second disks 204, 205.

The tensioning band 206 is tightened by tightening or loosening the tensioning screw 208 which first inserts into hole 207' and then inserts into threaded hole 207, thus adjusting the gap 223 between the two ends of tensioning band 206. The tensioning band 206 preferably has a slight outward bias to provide resistance against the tensioning screw 208. Alternatively, the tensioning screw 208 and holes 207, 207' could be replaced with other known fastening elements, such as, a high K constant spring, a clamp, a buckle, etc, as long as the fastening element is capable of bringing together two elements and maintaining a sufficient tension over time.

With reference to both FIG. 1 and FIG. 2, the first disk 104, 204 includes holes 210 which allow the mounting screws 103 to attach the first disk 104, 204 to the structural support 101. Alignment of the optical element 112 should only be lost if the first disk 104, 204 and/or the second disk 105, 205 rotate with respect to each other. Therefore, even if the tensioning band 106, 206 were to loosen, it would be unlikely for the first disk 104, 204 and the second disk 105, 205 to change their rotational relationship with respect to each other when subjected to expected temperature variations and vibrational forces.

If the removal and return of the optical element 112 and the second disk 105, 205 is anticipated, the orientation of the first disk 104, 204 and the second disk 105, 205 can be physically marked on the first disk 104, 204 and the second disk 105, 205. Alternatively, an absolute scale can be added to the first and second disks 104, 204, 105, 205 for marking the relative angular position of the first and second disks 104, 204, 105, 205. The optical element 112 and the second disk 105, 205 can be later returned to position without the need for a realignment procedure. The tightening of the tensioning band 106, 206 should not alter the relative positions of the first disk 104, 204 and the second disk 105, 205 in normal circumstances.

In order to operate this embodiment of the present invention, a user lines up the mechanical axis 122 of the first disk 104, 204 with the centering hole 102 of the structural support 101. Then, mounting screws 103 would be used to fasten the first disk 104, 204 to the structural support 101 through holes 210. Next, the optical element 112 is attached to the second disk 105, 205 by the use of clips 113 and pads 111. The second disk 105, 205 is then mated with the first disk 104, 204 by inserting the center conical portion 109, 209 into the center hole 114, 214. The order of these last two steps can be reversed. The tensioning band 106, 206 is then positioned such that the lip portions 221 of the first and second disks 104, 204, 105, 205 are then inserted into the groove 222 of by the tensioning band 106, 206.

The angle of alignment of the optical element 112 is then adjusted by rotating the second disk 105, 205 with respect to the first disk 104, 204. When the proper alignment is established, the tensioning band 106, 206 is tightened by narrowing the gap 223 between the two ends of the tensioning band 106, 206 with the tensioning screw 208.

If it is desired to remove and later return the second disk 105, 205 while connected to the optical element 112, a mark is made on both the first disk 104, 204 and the second disk 105, 205 such that the second disk 105, 205 can be returned to its aligned position without the need for further adjustments. Alternatively, if an absolute scale is added to the first and second disks 104, 204, 105, 205, the return of the second disk 105, 205 would only require returning it to the position as indicated on the absolute scale.

Figure 3:
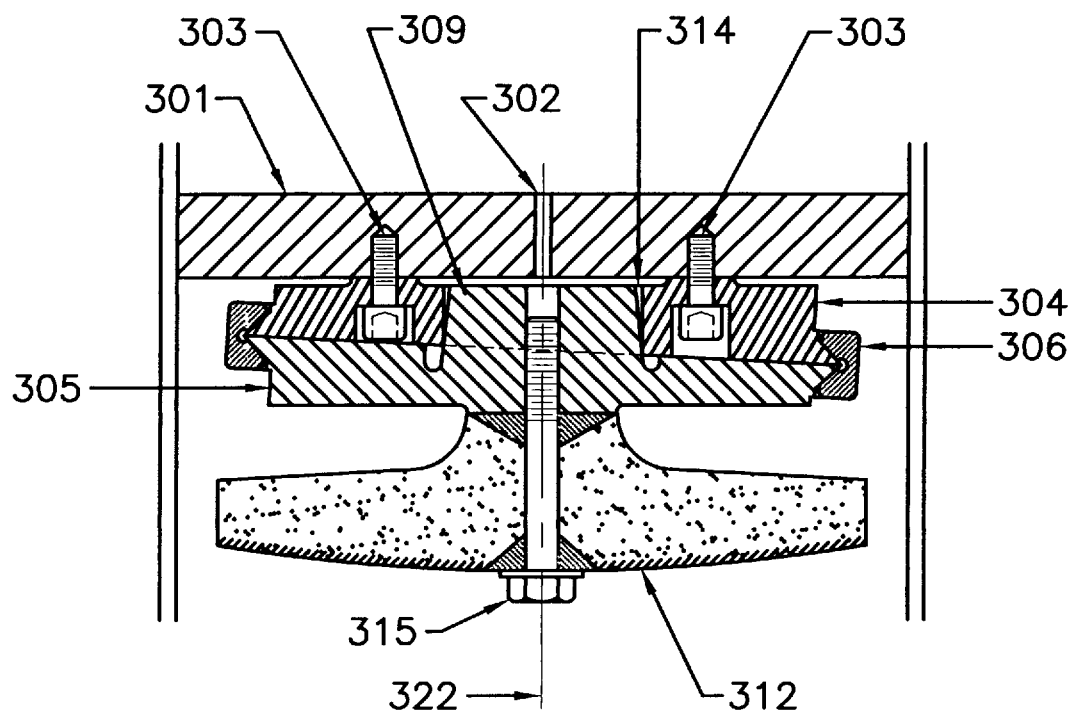
FIG. 3 is a cross-sectional view of an alternate embodiment of the present invention.

Referring to FIG. 3, a center bolt 315 is used to mount the optical element 312, in this case a mirror, to the second disk 305. The first disk 304 is attached to the structural support 301 by use of screws or bolts 303. Alternatively, the structural support 301 and the first disk 304 could be constructed of a single piece of material such that the first disk 304 would not require screws or bolts 303 in order to attach the first disk 304 to the structural support 301. A single piece of material comprising both the structural support 301 and the first disk 304 should preferably have surfaces perpendicular to the mechanical axis 322.

Figure 4:
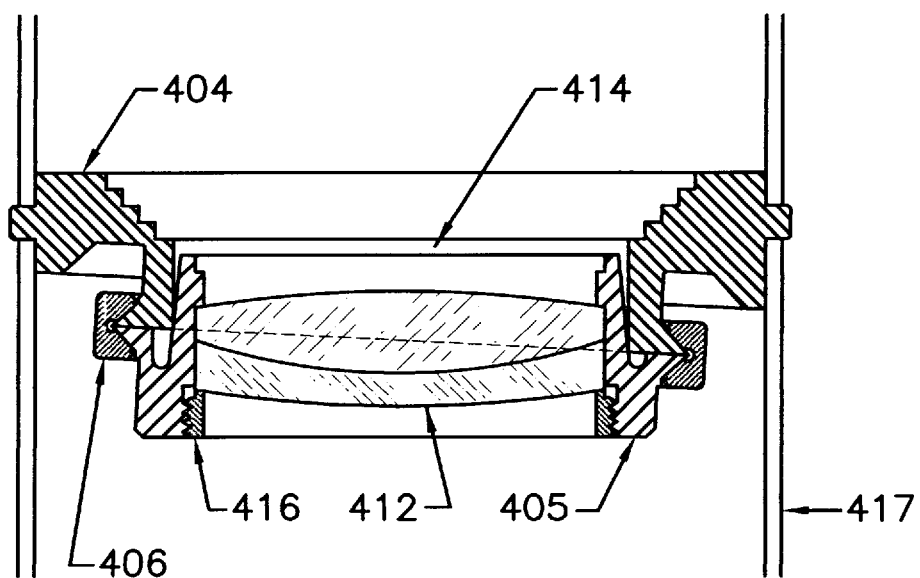
FIG. 4 is a cross-sectional view of an alternate embodiment of the present invention for use with large lenses.

Referring to FIG. 4, another embodiment of the present invention is illustrated wherein the first disk 404 is connected to the structural support 417 such as a support tube. In this particular embodiment, the optical element 412 is a double lens which is attached to the second disk 405 by use of a retaining ring 416. This arrangement is particularly suitable for large lenses, small mirrors, and optical windows, i.e. elements which do not require back support. The double lens 412 shown in FIG. 4 can be substituted by any other large lens or mirror. The lens 412 can be located longitudinally within the second disk 405 such that the optical node of the lens 412 intersects the plane formed by the angled surface. The intersection of the optical node with the angled surface plane does not produce an image shift resulting from adjustments made to the lens 412 by rotating the second disk 405 with respect to the first disk 404. Alternatively, when using a mirror, a vertex shift is not produced when the mirror is located longitudinally within the second disk 405 such that the vertex of the mirror intersects the plane formed by the angled surface. If the angled surfaces of both the first and second disks 404, 405 are kept small, such as, one half to one degree, then the circumferential displacement can be, depending on the diameter of the optical element 412, as small as 0.001 inches which will usually fall within the maximum allowable displacement. One skilled in the art will be aware of the maximum displacement allowable for their particular use of the present invention.

Figure 5:
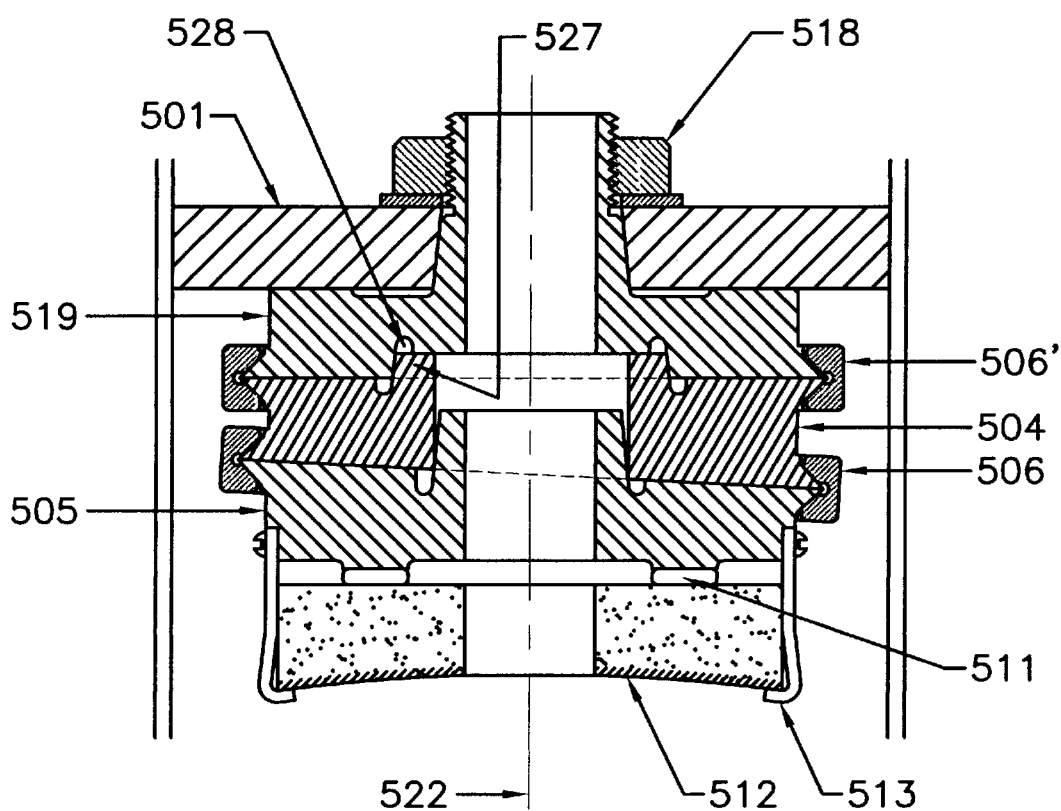
FIG. 5 is a cross-sectional view of an alternate embodiment of the present invention using a support disk.

Referring to FIG. 5, a support disk 519 is provided which is connected to the structural support 501 by use of a nut 518 or any other fastening mechanism. The support disk 519 need not have an angled surface since its function is primarily to allow rotation when it would be difficult to rotate the structural support 501. The support disk 519 may be of many different configurations so long as it can rotate and be clamped to the structural support 501. The nut 518 may be substituted by any commonly known clamping or fastening elements, e.g., screws, bolts, springs, etc. The support disk 519 is attached to the first disk 504 by use of the tensioning band 506' in the same manner as described in the description of FIG. 2, above. For this embodiment, the first disk 504 has a center conical portion 527 which is received by a center hole 528 of the support disk 519, thereby centering the first disk 504. Instead of the use of center conical portion 527 and center hole 528, a projection on the first disk 504 could mate with a depression or groove on the support disk 519 or vice versa.

Figure 6:
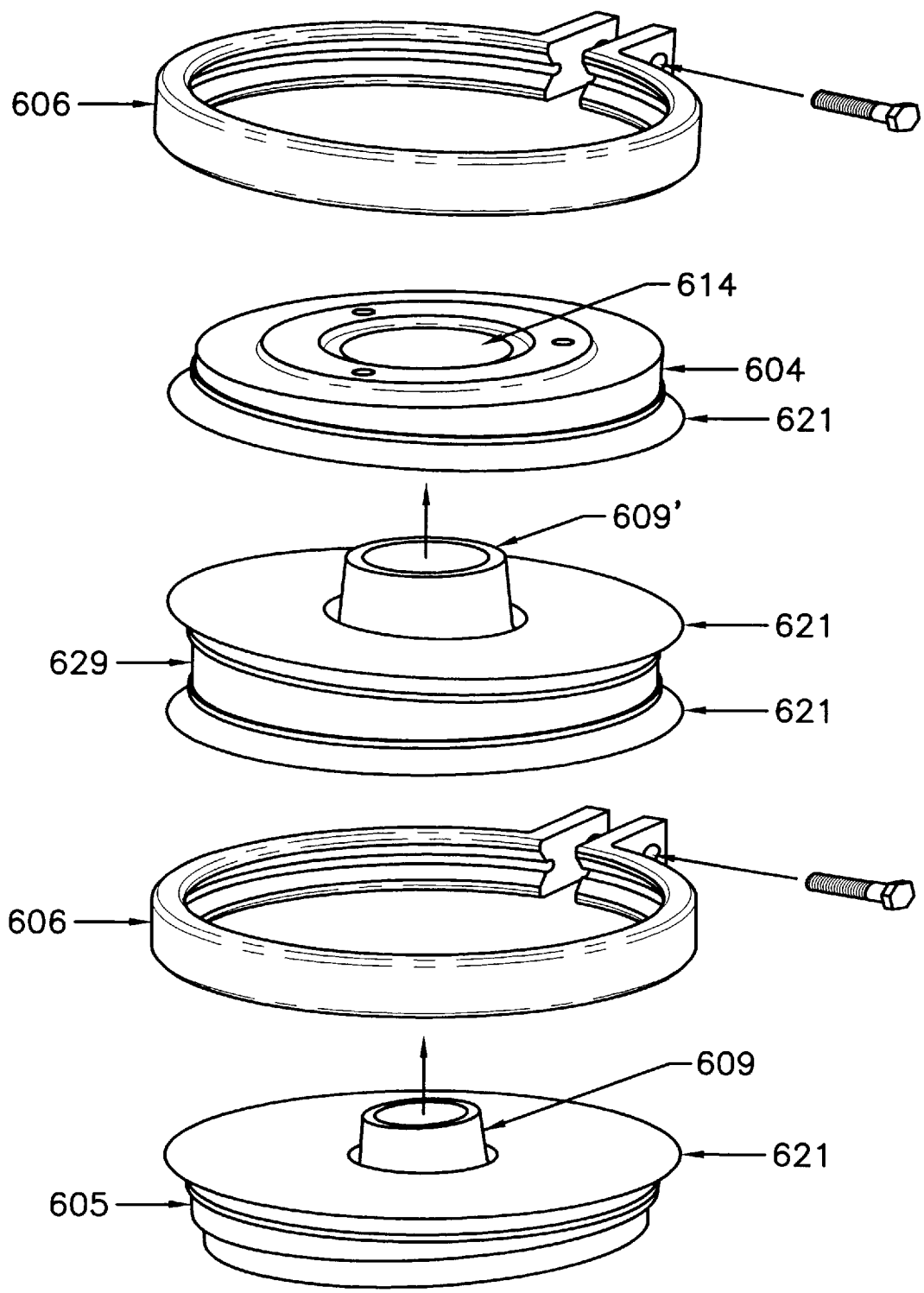
FIG. 6 is a cross-sectional view of an alternate embodiment of the present invention using an intermediate disk.
Figure 7A:
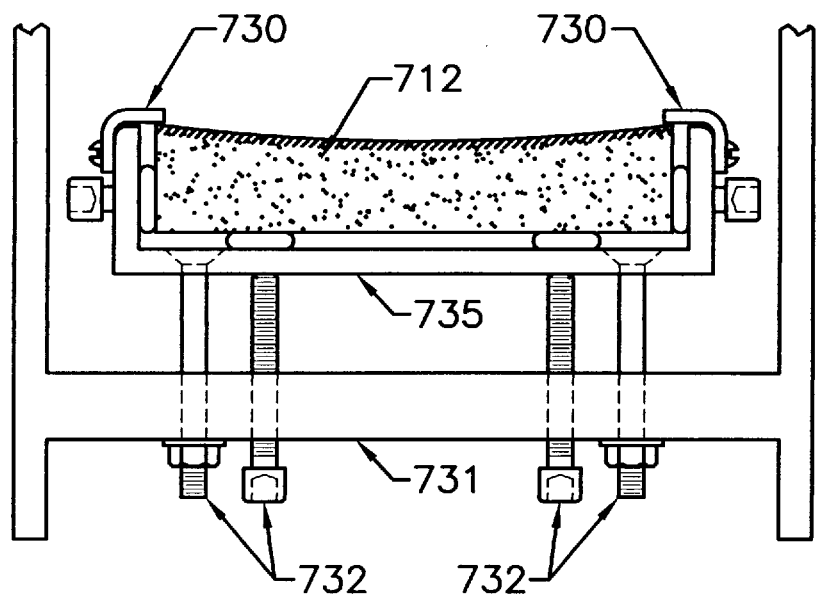
FIG. 7A is a cross-sectional view of a conventional push-pull cell arrangement.
Figure 7B:
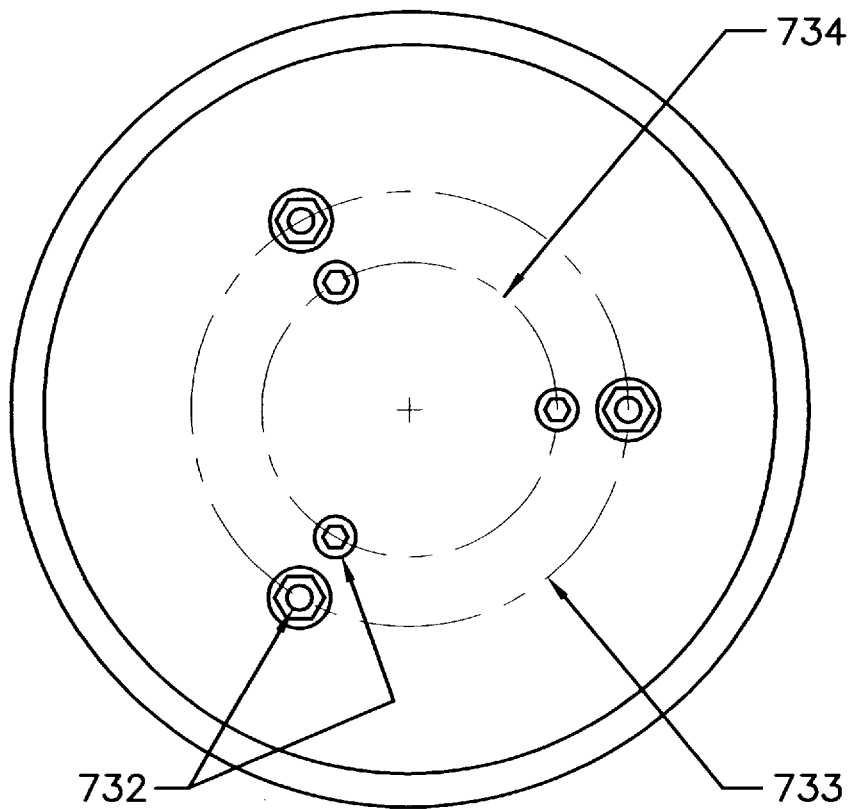
FIG. 7B is a bottom view of the arrangement shown in FIG. 7A.
Figure 8A:
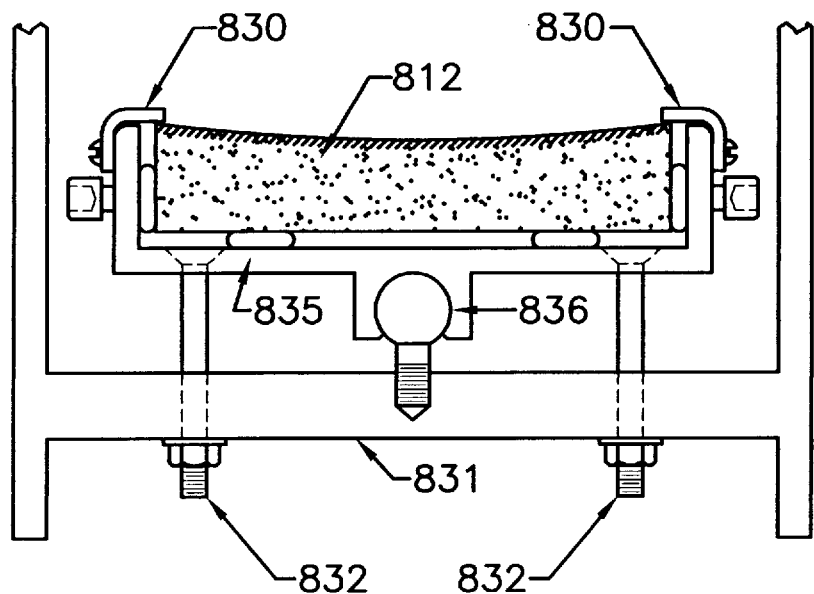
FIG. 8A is a cross-sectional view of a conventional center ball cell arrangement.
Figure 8B:
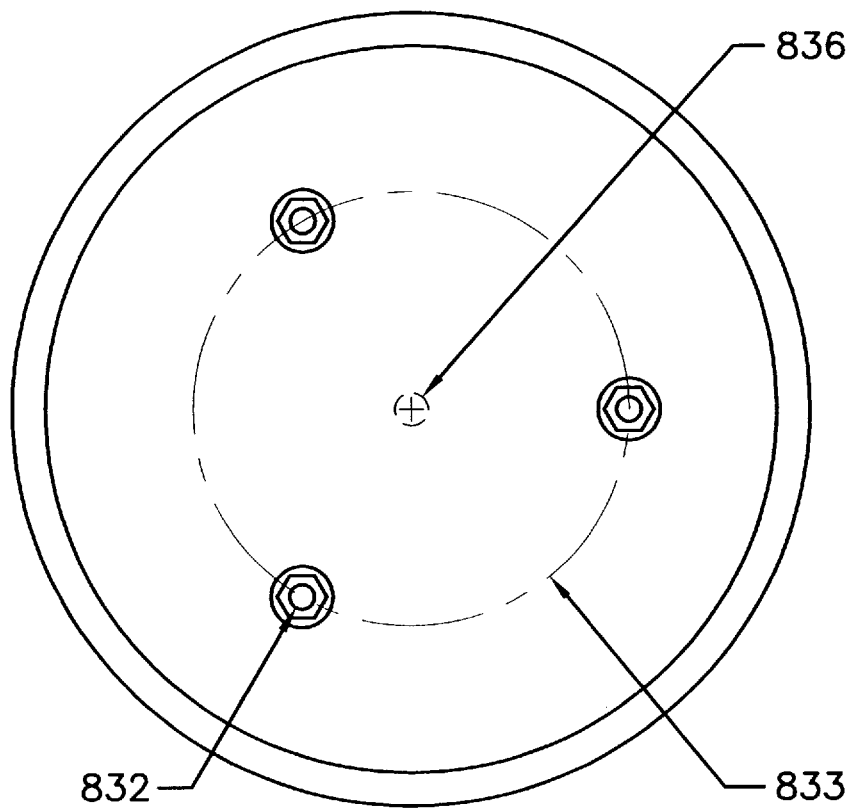
FIG. 8B is a bottom view of the arrangement shown in FIG. 8A.
Figure 9A:
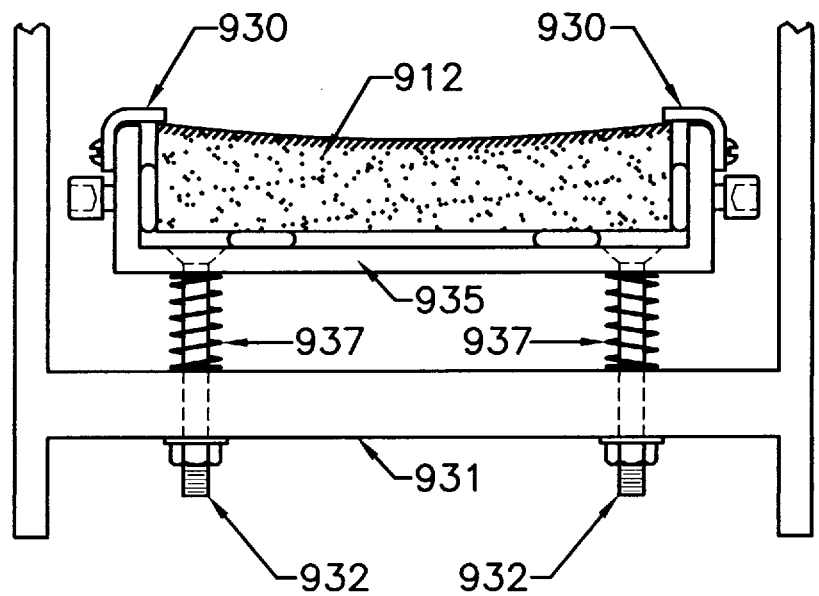
FIG. 9A is a cross-sectional view of a conventional spring tension cell arrangement.
Figure 9B:
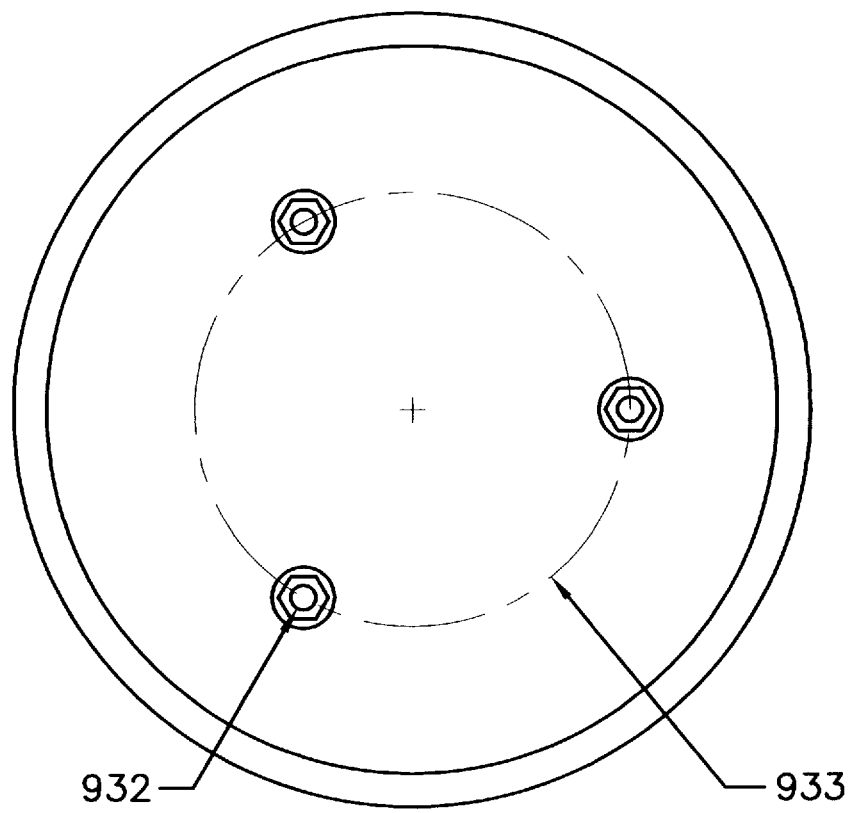
FIG. 9B is a bottom view of the arrangement shown in FIG. 9A.

Referring to FIG. 6, the use of an intermediate disk 629 is shown. Intermediate disk 629 includes one or two angled surfaces with respect to the mechanical and optical axes 122. The intermediate disk 629 includes two lip portions 621 protruding from the peripheral edges of each contacting surface of the intermediate disk 629 such that each side of the intermediate disk 629 may be attached to another disk surface. Intermediate disk 629 includes a hollow center conical portion 609' which inserts into either the center hole 614 of the first disk 604 or into a hollow center conical portion of another intermediate disk (not shown). In FIG. 6., the intermediate disk 629 is attached to both the first disk 604 and the second disk 605 by inserting the hollow center conical portion 609' into the center hole 614 and inserting the center conical portion 609 into the hollow center conical portion 609'. Tensioning bands 606 are used to attach each set of adjacent disks in the same manner as described with reference to FIG. 2, above.

Figure 10:
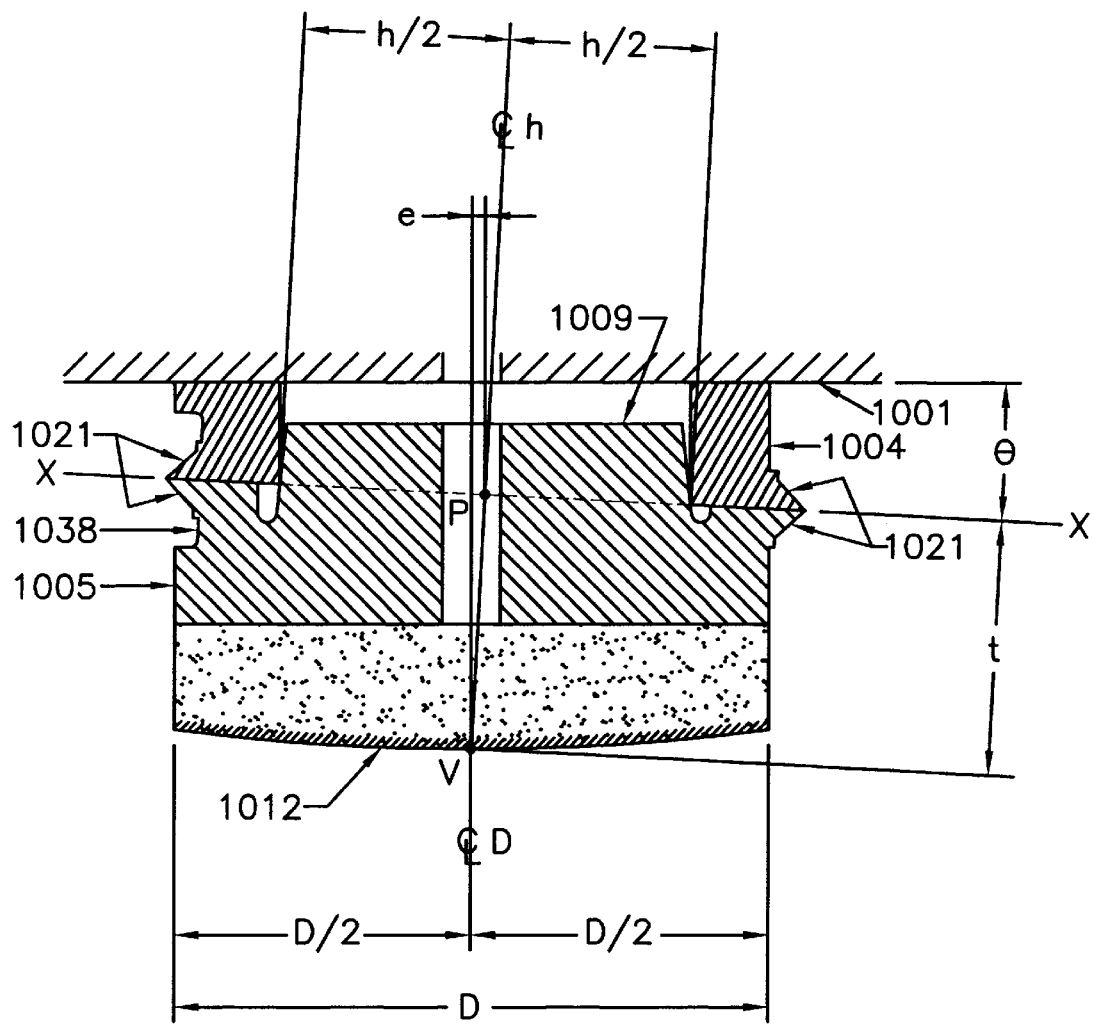
FIG. 10 is a cross-sectional view of an alternate embodiment of the present invention.

FIG. 10 illustrates an alternate embodiment which is used for the mounting of optics which are sensitive to sideways and longitudinal displacement. FIG. 10 has been simplified by the omission of some elements. One of ordinary skill will recognize that some elements, such as the tensioning band, have been omitted from this illustration. Line X—X identifies the tilt plane between the first disk 1004 and the second disk 1005. Line V-P identifies the turn axis of the first disk 1004 and the second disk 1005 and is perpendicular to line X—X. The vertex V near the face of the mirror 1012 is approximately centered in the mirror's diameter. Point P represents the center of the center conical portion 1009. The length of line V-P is marked t, and the sideways displacement (offset) of point P from the optical axis of the mirror 1012 is marked e. A hole is present in the first disk 1004 and second disk 1005 in order to aid in the proper alignment with reference to the vertex V. Diameter D may only need to be approximately centered with respect to vertex V depending on the tolerance of the specific application. The hole may also be suitably large to pass a light cone, if needed. By using line V-P as the turn axis between the first and second disks 1004 and 1005, the vertex V will always remain on that axis. Also, t will remain constant in length so that no sideways translation of vertex V nor longitudinal change in its position with respect to the plane X—X will occur. In order to accommodate the offset e of point P, the lip portions 1021 are centered on point P thereby leaving a cutout portion 1038 of the first and second disks 1004 and 1005 with a width of approximately twice that of the offset e.

The embodiment of FIG. 10 will work best if the angled surfaces of both the first and second disks 1004, 1005 are kept small, such as one half to one degrees, in order to hold the position of the vertex V within an acceptable tolerance since the center conical portion 1009 in the tilted plane X—X of the first disk 1104 is presented very slightly elliptical to the center hole 1014. One skilled in the art will be aware of the maximum displacement allowable for their particular use of the present invention.

Figure 11:
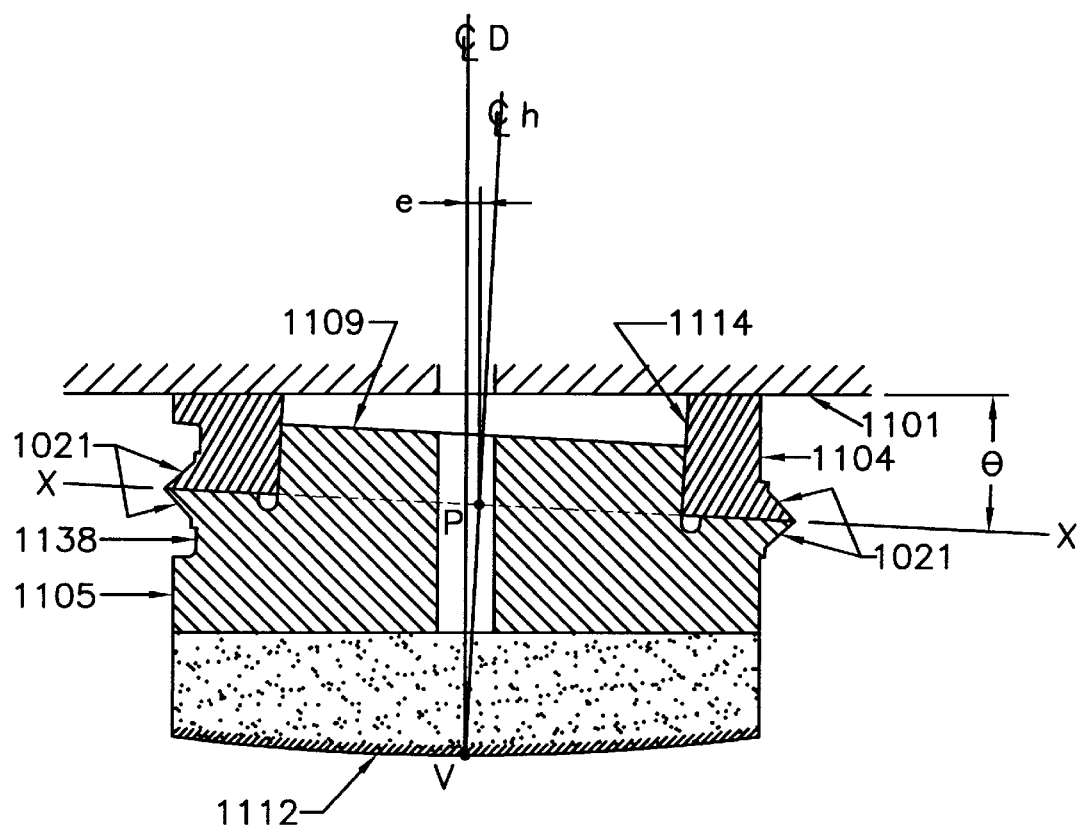
FIG. 11 is a cross-sectional view of an alternate embodiment of the present invention.

FIG. 11 illustrates an alternate embodiment of the present invention which provides an alternative to the center conical portion 1009 on the second disk 1005. FIG. 11 has been simplified by the omission of some elements. One of ordinary skill will recognize that some elements, such as the tensioning band, have been omitted from this illustration. A center cylindrical portion 1109 on the second disk 1105 fits into the center hole 1114. The center cylindrical portion's axis V-P is perpendicular to the plane X—X, allowing the second disk 1105 to rotate accurately while adjusting the first disk 1104. This embodiment can accommodate a large angle value and still maintain the vertex V of the mirror 1112 at an acceptable location.

While specific embodiments of the invention have been disclosed, variations in structural detail within the scope of the appended claims will occur to those skilled in the art. There is no intention to limit the invention to the exact embodiments herein presented. The above-described arrangements are only illustrative of the application of the principles of the invention. Alternative embodiments of the invention will be apparent to those skilled in the art.

It will be readily apparent to one practicing the present invention that this optical system can be used in various environments. Some of the practical applications include: machine optics; commercial astronomy optics, e.g., Celestron®, Meade®, etc.; military optics, e.g. missiles, armored vehicles, soldier-carried weapons, aircraft; scientific optics, e.g., astronomical telescopes; medical optics; metrology, e.g., the base for a telescope in a surveyor's level; and other environments which undergo vibration or temperature variations.

In addition, other uses of the mounting system and method of the present invention further include a device for leveling, truing, or for providing angular compensation, e.g., a base for columns, a bearing surface for beams, an outrigger device for stabilizing, tables for the accurate machining of raw stock clamped atop at any angle up to twice the angle of the tilted plane relative to the base, tables for the alignment of optics sitting atop, and tables for the accurate leveling of fluids in pans or containers.

One practicing the present invention may further use the present invention to provide for the accurate measurement of elevation, e.g., a table containing an optical device atop for sighting and scales on the horizontal disks which measure the relative angle. Utilizing two such units, one at each end of a measured base line, is one way to allow for accurate, simultaneous measurement of elevation and distance.

In addition, with the addition of a gasket on the inside surface of the tensioning band and the addition of a pipe flange or other type of pipe receiving receptacle carried by each disk, the present invention may further provide for an angularly-adjustable, pipe-splicing joint.

What is claimed is:

1. A mounting system comprising:
    support means for providing a stable support surface;
    a first disk connected to said support means, said first disk comprising an angled surface and a center hole;
    a second disk, said second disk comprising an angled surface and a center portion for insertion into said center hole of said first disk;
    a tensioning band, said tensioning band encircling a portion of said first disk and said second disk; and
    means for mounting an element on said second disk.

2. A system according to claim 1 wherein said center portion is conical.

3. A system according to claim 1 wherein said center portion is cylindrical.

4. A system according to claim 1 wherein said tensioning band comprises means for adjusting the tension of said tensioning band.

5. A system according to claim 1 wherein said means for mounting mounts said element to said second disk.

6. A system according to claim 1 wherein said tensioning band comprises a groove which is located in an inner portion of said tensioning band.

7. A system according to claim 6 wherein both a portion of said first disk and a portion of said second disk fit into said groove of said tensioning band.

8. A system according to claim 7 wherein a cross-section of said groove of said tensioning band is triangular in shape.

9. A system according to claim 1 wherein said first disk further comprises a plurality of holes in order to attach said first disk to said support means.

10. A system according to claim 1 wherein said support means comprises a support disk, said support disk comprising means for centering said first disk.

11. A system according to claim 10 wherein said mounting system further comprises a support tensioning band, said support tensioning band encircling a portion of said first disk and a portion of said support disk.

12. A system according to claim 11 wherein said tensioning band comprises a groove which is located in an inner portion of said tensioning band and said support tensioning band comprises a second groove which is located in an inner portion of said support tensioning band.

13. A system according to claim 12 wherein both a first portion of said first disk and a portion of said second disk insert into said groove of said tensioning band and both a second portion of said first disk and a portion of said support disk insert into said second groove of said support tensioning band.

14. A system according to claim 1 wherein said means for mounting an element comprises:
    a plurality of clips; and
    a plurality of pads.

15. A system according to claim 1 wherein said means for mounting an element comprises a retaining ring.

16. A system according to claim 1 wherein said means for mounting an element comprises a center bolt.

17. A system according to claim 9 wherein said first disk is attached to said support means with screws which are inserted through said holes.

18. A mounting system comprising:
    support means for providing a stable support surface;
    a first disk connected to said support means, said first disk comprising an angled surface and a center hole;
    at least one intermediate disk, said at least one intermediate disk comprising an angled surface and a hollow center portion;
    a second disk, said second disk comprising an angled surface and a center portion;
    a plurality of tensioning bands, each of said tensioning bands encircling a portion of adjacent disks; and
    means for mounting an element.

19. A system according to claim 18 wherein said hollow center portion and said center portion are conical.

20. A system according to claim 18 wherein said hollow center portion and said center portion are cylindrical.

21. A system according to claim 18 wherein said plurality of tensioning bands each comprises means for adjusting the tension of each of said tensioning bands.

22. A system according to claim 18 wherein said means for mounting mounts said element to said second disk.

23. A system according to claim 18 wherein each of said plurality of tensioning bands comprises a groove which is located in an inner portion of each of said plurality of tensioning bands.

24. A system according to claim 23 wherein a portion of adjacent disks insert into said groove of each of said plurality of tensioning bands.

25. A system according to claim 23 wherein a cross-section of said groove of each of said plurality of tensioning bands is triangular in shape.

26. A system according to claim 18 wherein said first disk further comprises a plurality of holes in order to attach said first disk to said support means.

27. A system according to claim 18 wherein said support means comprises a support disk, said support disk comprising means for centering said first disk.

28. A system according to claim 27 wherein said mounting system further comprises a support tensioning band, said support tensioning band encircling a portion of said first disk and a portion of said support disk.

29. A system according to claim 28 wherein each of said plurality of tensioning bands comprises a groove which is located in an inner portion of each of said plurality of tensioning bands and said support tensioning band comprises a second groove which is located in an inner portion of said support tensioning band.

30. A system according to claim 29 wherein a portion of adjacent disks insert into said groove of each of said plurality of tensioning bands; and
    wherein both a portion of said first disk and a portion of said support disk insert into said second groove of said support tensioning band.

31. A method of mounting an element using a first disk and a second disk each having an angled surface, said first disk having a center hole and said second disk having a center portion, said method comprising the steps of:

connecting said first disk to support means;

inserting said portion of said second disk into said center hole of said first disk;

mounting an element to said second disk; and encircling a portion of said first disk and a portion of said second disk with a tensioning band.

32. A method according to claim 31 further comprising the steps of:

marking the relative angular relationship between the first and second disks;

removing said second disk from said first disk for servicing; and repeating said inserting and encircling steps using said marked angular relationship as a guide.

33. A method according to claim 31 wherein said tensioning band comprises a groove which is located in an inner portion of said tensioning band, said method further comprising the steps of:

inserting both a portion of said first disk and a portion of said second disk into said groove of said tensioning band.

34. A method according to claim 31 wherein said support means comprises a third disk which comprises means for centering said first disk, said method further comprises the steps of:

encircling a portion of said first disk and a portion of said third disk with a second tensioning band.

35. A method according to claim 34 comprising the further steps of:

providing said tensioning band with a groove which is located in an inner portion of said tensioning band;

providing said second tensioning band with a second groove which is located in an inner portion of said second tensioning band;

inserting both a first portion of said first disk and a portion of said second disk into said groove of said tensioning band; and inserting both a second portion of said first disk and a portion of said third disk into said second groove of said second tensioning band.

\* \* \* \* \*